UNITED STATES PATENT OFFICE.

IGNAZ ROSENBERG, OF BIEBRICH, GERMANY, ASSIGNOR TO KALLE & CO., OF SAME PLACE.

BROWN SUBSTANTIVE DYE.

SPECIFICATION forming part of Letters Patent No. 588,183, dated August 17, 1897.

Application filed July 29, 1896. Serial No. 600,982. (Specimens.) Patented in England May 7, 1895, No. 9,103, and in France May 22, 1895, No. 247,626.

*To all whom it may concern:*

Be it known that I, IGNAZ ROSENBERG, residing at Biebrich-on-the-Rhine, in the Empire of Germany, have invented a new and useful improvement in the manufacture of substantive trisazo dyestuffs from diamins, 1.3 naphthylenediamin mono or di sulfo-acids, and other amins or phenols or sulfo or carbo acids of such compounds, (for which Letters Patent have been obtained as follows: In England, No. 9,103, dated May 7, 1895, and in France, No. 247,626, dated May 22, 1895,) of which the following is an exact description.

By employing the primary or mixed tetrazo dyestuffs described in my simultaneous patent applications filed July 29, 1896, Serial Nos. 600,979, 600,981, and 600,980, which contain a 1.3 naphthylenediamin mono or di sulfo-acid as component part, I have succeeded in producing a new class of substantive trisazo dyestuffs which are of great value in the arts. All these dyestuffs possess the important property of dyeing unmordanted cotton in shades extremely fast to light, washing, and alkalies.

For the production of this new class of substantive trisazo dyestuffs which are the subject-matter of this application I prepare any of the primary or mixed tetrazo dyestuffs sufficiently described in my above-referred-to applications by combining one molecule of a tetrazotized diamin either with two molecules of a 1.3 naphthylenediamin mono or di sulfo-acid or with one molecule of such a 1.3 naphthylenediamin sulfo compound and one molecule of any other amin or of any phenol or of sulfo or carbo acids of such compounds. The dyestuffs so obtained are subsequently rediazotized with hydrochloric acid and as much nitrite of sodium as they are able to take up and combined in alkaline or weakly-acid liquid with a corresponding quantity of an amin or a phenol or sulfo or carbo acid thereof. The shades of the so-formed dyestuffs vary from brown to deep black.

In carrying out my invention I proceed as follows:

Example: 31.3 kilos of the mixed tetrazo dyestuffs, prepared by combining equimolecular proportions of tetrazotized benzidin, salicylic acid, and 1.3.6 naphthylenediamin-monosulfo-acid, are dissolved in about six hundred liters of water. Then fifteen kilos of muriatic acid are added, and, finally, a solution of 3.5 kilos sodium nitrite is gradually run into the liquid. The so-formed fine suspension of the diazotized tetrazo color is introduced into an aqueous solution of 6.5 kilos of metatoluylenediamin. A brown dyestuff is formed, and in order to accelerate the combination acetate of soda is added, and the mass is warmed after some hours standing. The separated dyestuff is filtered off, pressed, and dried. After drying and grinding it forms a dark-brown powder of greenish bronze easily soluble in hot water, insoluble in alcohol, soluble in concentrated sulfuric acid with reddish-violet coloration. On alkaline reduction with zinc-dust it gives a colorless solution, quickly turning brown when exposed to the air. It dyes unmordanted cotton in an alkaline salt bath deep brown. If benzidin is replaced by tolidin in this example, the resulting coloring-matter dyes a more yellowish shade. The substitution of metatoluylenediamin by metaphenylenediamin changes the shade only very slightly.

Instead of the salicylic acid azodiphenyl-azo 1.3.6 naphthylenediamin-monosulfo-acid in the example given above other primary and mixed tetrazo colors containing a 1.3 naphthylenediamin mono or di sulfo-acid as component part, as described in my simultaneous application, may be employed. The metatoluylenediamin may be replaced by other amins or by a phenol or by a sulfo or carbo acid thereof. When, therefore, in this specification I refer to these specific bodies, I mean thereby to include also all of their equivalents—namely, compounds of a similar nature. The dyestuffs obtained by such substitutions are all intended to be included in the present invention.

Now what I claim is—

1. The process of producing new substantive dyestuffs consisting in combining the rediazotized primary or mixed tetrazo dyestuffs characterized by containing a 1.3 naphthylenediamin sulfo-acid as component part with an amin substantially as described.

2. The process of producing the specific substantive dyestuff having the formula:

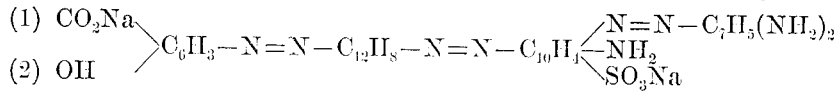

by combining rediazotized salicylic acid azo diphenyl azo 1.3.6 naphthylenediamin-monosulfo-acid with a molecule of metatoluylenediamin in weakly-acid solution substantially as described.

3. A new substantive dyestuff derived from 1.3 naphthylenediamin mono or di sulfo-acids, of which the specific dyestuff with the formula:

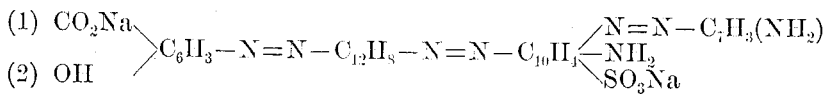

is an example, which are after drying and grinding dark-brown powder of greenish bronze easily soluble in hot water, insoluble in alcohol, soluble in concentrated sulfuric acid with reddish-violet coloration, giving on alkaline reduction with zinc-dust colorless solutions quickly turning brown when exposed to the air and dyeing a deep fast brown on unmordanted cotton substantially as described.

4. The specific brown substantive dyestuff with the formula:

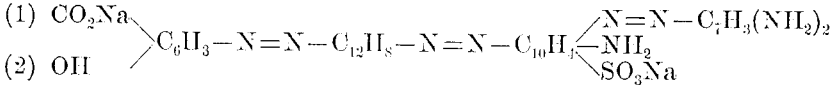

which dyestuff is producible by combining rediazotized salicylic acid azo diphenyl azo 1.3.6. naphthylenediamin-monosulfo-acid with metatoluylene-diamin in weakly-acid solution, and which represents after drying and grinding a dark-brown powder of greenish bronze easily soluble in hot water, insoluble in alcohol, soluble in concentrated sulfuric acid with reddish-violet coloration, giving on alkaline reduction with zinc-dust a colorless solution quickly turning brown when exposed to the air and dyeing a deep fast brown on unmordanted cotton and having a'l the qualities substantially as described.

In testimony whereof I have signed my name to this specification in the presence of two subscribing witnesses.

IGNAZ ROSENBERG.

Witnesses:
FRIEDRICH KNECKE,
HEINRICH MISCHLER.